March 22, 1966  J. S. FALZONE  3,241,536
ANTI-SMOG MEANS
Filed Nov. 27, 1964

INVENTOR.
JOSEPH S. FALZONE
BY James P. Malone

United States Patent Office 3,241,536
Patented Mar. 22, 1966

3,241,536
ANTI-SMOG MEANS
Joseph S. Falzone, Old Bethpage, N.Y., assignor of twenty percent to James P. Malone, Syosset, N.Y.
Filed Nov. 27, 1964, Ser. No. 414,178
6 Claims. (Cl. 123—119)

This application is a continuation in part of my co-pending application of the same title, Serial No. 193,085, filed May 8, 1962, now Patent No. 3,166,060, granted January 19, 1965, and is an improvement of my Patent Nos. 2,969,782, of the same title granted January 31, 1961, and 3,042,014 of the same title granted July 3, 1962. This application provides improved pickup means from the exhaust system and an improved pneumatic tank.

This invention relates to anti-smog means for internal combustion engines and more particularly to means for reducing air pollution caused by automobiles and at the same time increasing the efficiency of automobile engines.

It is well known that the efficiency of internal combustion engines is quite low. One of the factors in this low efficiency is the lack of optimum mixing of the gasoline and air which results in incomplete combustion which represents a loss of potential energy and an increase in unburnt hydrocarbons, smoke and soot output from the exhaust, and carbon monoxide emission.

The air pollution caused by automobiles in large cities contributes greatly to the industrial smog which is a serious problem and which is becoming more acute as time goes on.

The present invention provides a means for minimizing smog due to incomplete combustion of automobile engines by recirculating a major portion of the exhaust gasses back through the engine. Therefore, the present invention not only minimizes smog and pollution but by the same process extracts extra energy out of the unburnt fuel so that the optimum condition is obtained whereby there is a maximum combustion and a minimum of waste products.

More specifically, the invention provides feedback means inserted between the engine exhaust and the intake manifold; a pickup means is provided in the exhaust pipe. The exhaust gasses are taken from the pickup and recirculated through the combustion chambers.

A pneumatic tank is provided in the recirculating path which may be used for pressure valves, to maintain a constant air fuel ratio, to connect a crankcase breather pipe, and to add alcohol or a catalyst to the fuel mixture for instance to minimize smog or for special conditions such as icing of the carburetor.

Accordingly, a principal object of the invention is to provide new and improved fuel feeding and handling means for internal combustion engines.

Another object of the invention is to provide means to minimize air pollution or smog caused by automobile engines, which will fit any engine without modification.

Another object of the invention is to provide means to minimize air pollution or smog caused by automobile engines in combination with means to increase the mileage efficiency of automobile engines.

Another object of the invention is to provide means to minimize air pollution or smog caused by automobile engines in combination with means to increase the efficiency of automobile engines, including means to pick up the exhaust gasses to feed back a major portion of the exhaust gasses through the intake manifold, and automatic valving to minimize back pressure.

Another object of the invention is to provide new and improved means to add a catalyst or other additive to minimize the effects of smog, smoke or icing of the fuel lines.

These and other objects of the invention will be apparent from the following specification and drawings of which:

Figure 1:
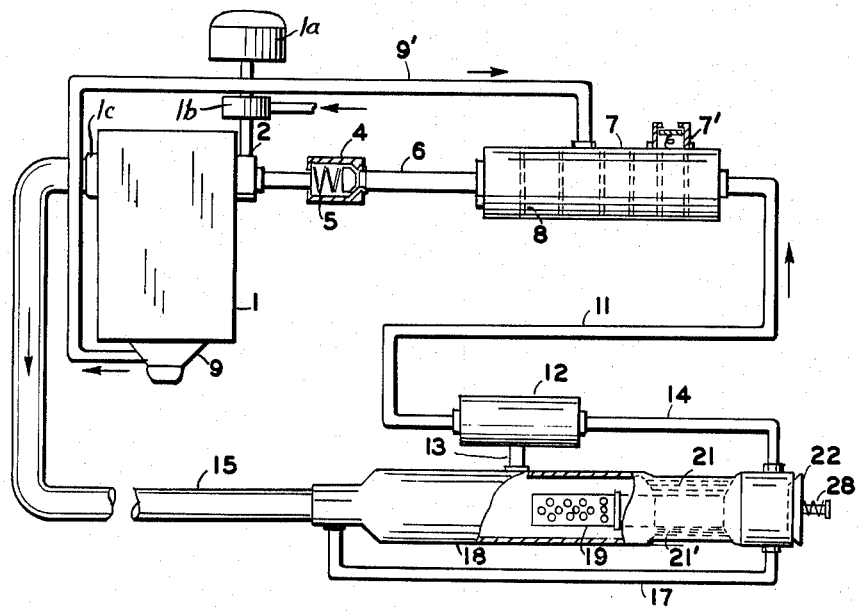
FIGURE 1 is a schematic diagram of an embodiment of the invention.

FIGURE 1 shows a schematic view of the invention. The internal combustion engine 1 is conventional and has an intake manifold 2 connected to conventional air filter 1a and carburetor 1b which has a conventional fuel supply and crankcase 9. The exhaust from the engine is fed by means of the exhaust pipe 15 in conventional manner from exhaust manifold 1c. A pickup means or fuel cell 18 is connected to the exhaust pipe and feeds back a major portion of the unburnt hydrocarbons via pipe 14, the differential pressure tank 12 and connection pipe 11 to the pneumatic tank 7.

The output of the pneumatic tank 7 is connected by means of the pipe 6 and pneumatic valve 4 to the input manifold 2. Valve 4 is spring loaded by spring 5. A crankcase breather pipe 9' is connected from the crankcase of engine 1 to the tank 7 and may be used independently of the exhaust recirculation system, if desired. Coupling 13 feeds back exhaust gasses to tank 12 and also serves to drain residue from tank 12.

The feedback gasses are fed through the pipe 14 to the tank 7 which has a plurality of perforated discs 8 for filtering out any solids in the feedback gasses. The crankcase breather pipe 9' is connected from the crankcase 9 to the tank 7 for the purpose of feeding back the crankcase fumes into the system.

The pickup means or fuel cell 18 is connected to the exhaust pipe 15. The pickup means 18 includes an impact pressure chamber to which is connected by coupling 13 and tube 14 to a differential pressure chamber 12. Extending into the rear of the impact chamber of the cell 18 is a cylindrical nozzle 19 which is connected to the relief valve 22. The safety relief valve 22 is adapted to open upon any excess pressure, for instance due to a backfire, and also drains out moisture. Impact pressure bleed tubes 21 and 21' bleed off pressures constantly to surge chamber and valve 22. A bypass line 17 is connected around the chamber 18 to bleed out acids. Pipe 17 bleeds out acids and water due to the specific gravities of the gasses involved (i.e. liquids being heavier than the unburned hydrocarbons will be picked up by pipe 17 and they will be discharged overboard).

In normal operation the valve 22 is normally closed so that substantially all of the exhaust gasses are fed back to the differential tank 12 which acts as a pressure averaging device and then via the connection 11 to the pneumatic tank 7. The pneumatic tank 7 provides filtering by means of the perforated baffles 8 and also provides a connection to the crankcase breather pipe. There would normally be a negative pressure of about ¼ lb. in the pneumatic tank proportional to that of the input manifold pressure. Tank 7 preferably has a negative pressure relief valve 7'.

The output of the pneumatic tank is fed by means of the tube 6 through the pneumatic valve 4 to the fuel input chamber or manifold 2. The valve 5 is also responsive to the input manifold pressure. A constant air to fuel ratio may be maintained due to the operation of the valving of valve 5. Valve 5 delivers the unburned hydrocarbons to the intake manifold in relation to the pressure in the manifold. The negative pressure in the manifold will draw the valve open and permit the gasses to enter the intake manifold. During high demand, if there is not enough flow from the tank the negative relief on the tank will open and permit air to enter the tank to supply valve 5. At least a portion of the feedback to the valve 5 is in liquid form. Therefore, a substantial portion of the unburnt hydrocarbon would be recirculated through the engine. The net effect of this is that the exhaust fumes and smog would be reduced to a minimum and also additional energy would be extracted from the unburnt gasses which would tend to increase the mileage efficiency of the engine. The impact pressure chamber of fuel cell 18 and the tank 7 also have a muffling effect so that the need for any additional muffler is minimized. The system is fail proof since if it fails, the engine will still operate in conventional manner.

Figures 2, 3:
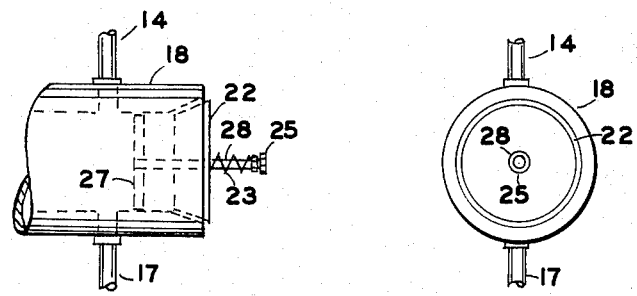
FIGURES 2 and 3 are detail views of the invention.

FIGURES 2 and 3 show side and rear detail views of the pressure relief valve 22 in the chamber 18. The end of the chamber is open but is normally closed by the valve member 22 which slides on the shaft guide 28 which is fixed to support bracket 27 mounted in chamber 18 and is spring mounted in closed position by means of spring 23. The spring pressure may be adjusted by means of the nut 25 which fits on the threaded end of the guide member 28.

Many modifications may be made by those who desire to practice the invention without departing from the scope thereof which is defined by the following claims.

I claim:
1. Anti-smog means for internal combustion engines of the type having a fuel intake channel, a crankcase, and an exhaust pipe,
   pickup means connected to said exhaust pipe including a relief valve,
   a tank connected to said pickup means,
   means connecting said intake channel to said tank to feed exhaust gasses to said fuel intake channel,
   said tank comprising a hollow cylinder having a plurality of partitions each having a plurality of pin holes and means connecting said crankcase to said tank.
2. Anti-smog means for internal combustion engines of the type having a fuel intake channel, a crankcase, and an exhaust pipe,
   pickup means connected to said exhaust pipe including a relief valve, a bypass pipe connected around said pickup means,
   a first tank connected to said pickup means, a second tank connected to said first tank,
   means including a pressure responsive valve connecting said intake channel to said second tank to feed exhaust gasses to said fuel intake channel,
   said second tank comprising a hollow cylinder having a plurality of partitions having a plurality of pin holes and means connecting said crankcase to said tank.
3. Anti-smog means for internal combustion engines of the type having a fuel intake channel, a crankcase, and an exhaust pipe,
   pickup means connected to said exhaust pipe including a relief valve,
   a tank connected to said pickup means, and means connecting said intake channel to said tank to feed exhaust gasses to said fuel intake channel,
   and means connecting said crankcase to said tank.
4. Anti-smog means for internal combustion engines of the type having a fuel intake channel, a crankcase, and an exhaust pipe,
   pickup means connected to said exhaust pipe,
   a tank connected to said pickup means,
   means connecting said intake channel to said tank to feed exhaust gasses to said fuel intake channel,
   said tank comprising a hollow cylinder having a plurality of partitions having a plurality of pin holes and means connecting said crankcase to said tank.
5. Anti-smog means for internal combustion engines of the type having a fuel intake channel, a crankcase, and an exhaust pipe,
   a tank,
   means connecting said intake channel to said tank to feed exhaust gasses to said fuel intake channel,
   said tank comprising a hollow cylinder having a plurality of partitions having a plurality of pin holes and means connecting said crankcase to said tank.
6. Anti-smog means for internal combustion engines of the type having a fuel intake channel, a crankcase, and exhaust pipe,
   a tank,
   means connecting said intake channel to said tank to feed gasses to said fuel intake channel,
   and means connecting said crankcase to said tank.

References Cited by the Examiner
UNITED STATES PATENTS

| | | | |
|---|---|---|---|
| 2,995,124 | 8/1961 | Wutrich | 123—119 |
| 3,035,561 | 5/1962 | Siegler | 123—119 |
| 3,042,014 | 7/1962 | Falzone | 123—119 |
| 3,146,768 | 9/1964 | Osborne | 123—119 |

KARL J. ALBRECHT, *Primary Examiner.*